United States Patent
Takayama et al.

(10) Patent No.: US 8,902,546 B1
(45) Date of Patent: Dec. 2, 2014

(54) HEAD STACK ASSEMBLY WITH LIGHT SHIELDING STRUCTURE, AND DISK DRIVE UNIT WITH THE SAME

(71) Applicant: SAE Magnetics (H.K.) Ltd., Hong Kong (CN)

(72) Inventors: Seiichi Takayama, Hong Kong (CN); Hideki Tanzawa, Hong Kong (CN); Osamu Harakawa, Hong Kong (CN); Takashi Honda, Hong Kong (CN); Ryuji Fujii, Hong Kong (CN)

(73) Assignee: SAE Magnetics (H.K.) Ltd., Hong Kong (CN)

( * ) Notice: Subject to any disclaimer, the term of this patent is extended or adjusted under 35 U.S.C. 154(b) by 0 days.

(21) Appl. No.: 13/967,669

(22) Filed: Aug. 15, 2013

(51) Int. Cl.
   *G11B 11/00* (2006.01)

(52) U.S. Cl.
   USPC ........................................................ 360/234.4

(58) Field of Classification Search
   USPC ..................................................... 360/234.4
   See application file for complete search history.

(56) References Cited

U.S. PATENT DOCUMENTS

| | | | |
|---|---|---|---|
| 6,016,290 A * | 1/2000 | Chen et al. ................. | 369/13.17 |
| 8,000,178 B2 * | 8/2011 | Shimazawa et al. ........ | 369/13.33 |
| 8,203,804 B2 * | 6/2012 | Taguchi et al. ........... | 360/125.31 |
| 8,223,597 B2 * | 7/2012 | Komura et al. ............ | 369/13.33 |
| 8,295,003 B2 * | 10/2012 | Chou et al. ..................... | 360/59 |
| 8,341,825 B2 * | 1/2013 | Hara et al. ................. | 29/603.12 |
| 8,588,040 B1 * | 11/2013 | Fujita et al. ................ | 369/13.33 |
| 2006/0143635 A1 * | 6/2006 | Liu et al. ....................... | 720/659 |

* cited by examiner

*Primary Examiner* — Mark Blouin
(74) *Attorney, Agent, or Firm* — Nixon & Vanderhye PC (57) ABSTRACT

A head stack assembly includes a mounting base, a plurality of drive arms connected with the mounting base, and multiple pairs of head gimbal assemblies connected with the drive arms. Each head gimbal assembly includes a thermal assisted magnetic head, the thermal assisted magnetic head has an air bearing surface, a bottom surface opposite to the air bearing surface, and a laser diode module mounted on the bottom surface and adapted to emit a downward laser light to a write element of the thermal assisted magnetic head and an upward laser light, wherein a light shielding structure is provided to prevent the upward laser light emitting to other laser diode modules to generate light coupling, thereby improving thermal stability of the thermal assisted magnetic head.

18 Claims, 11 Drawing Sheets

HEAD STACK ASSEMBLY WITH LIGHT SHIELDING STRUCTURE, AND DISK DRIVE UNIT WITH THE SAME

FIELD OF THE INVENTION

The present invention relates to a hard disk drive (HDD) with thermally assisted magnetic heads and, more particularly, to a head stack assembly (HSA) with a light shielding structure to shield undesired laser light emitted by a laser diode module to prevent light coupling generating between adjacent laser diode modules.

BACKGROUND OF THE INVENTION

HDDs are common information storage devices. With improvements in recording density of magnetic HDDs, there has been a demand for improving the performance of magnetic heads and magnetic recording media. In a magnetic hard disk drive, a magnetic head is mounted on a slider that flies above the surface of a magnetic recording medium.

Recently, a technology so-called thermal assisted magnetic recording has been proposed, and a thermal assisted magnetic head also has been put to use. The technology uses a magnetic recording medium having high coercivity. When writing data, a write magnetic field and heat are applied almost simultaneously to the area of the magnetic recording medium where to write data, so that the area rises in temperature and drops in coercivity for data writing. The area where data is written subsequently falls in temperature and rises in coercivity to increase the thermal stability of magnetization.

Figure 1A:
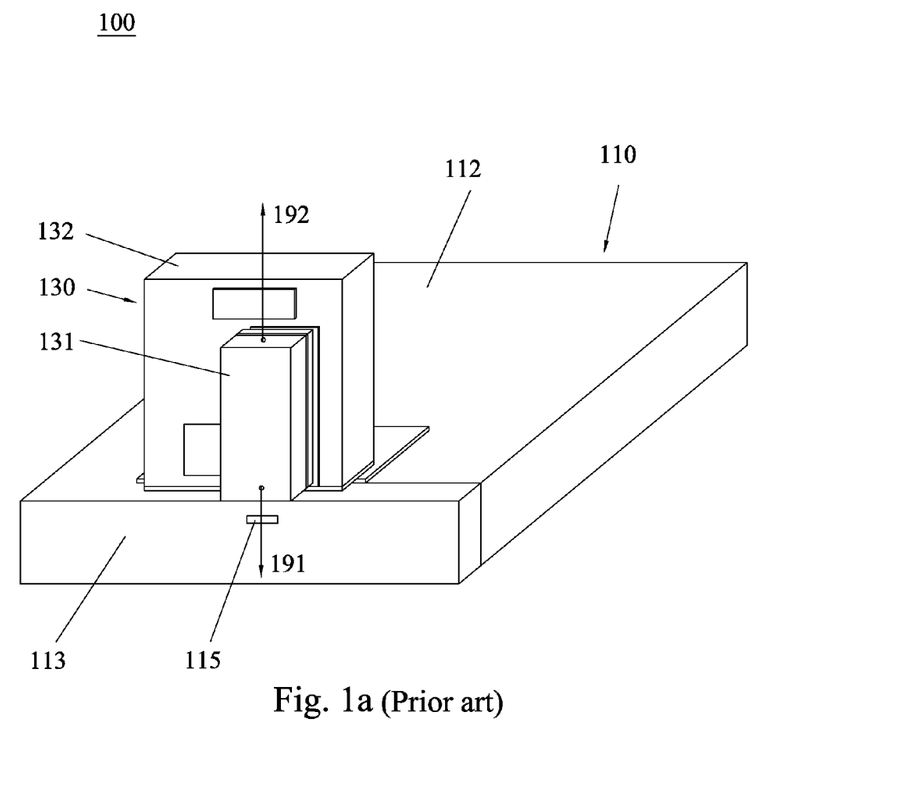
FIG. 1a is a partial exploded perspective view of a conventional thermal assisted magnetic head.

Commonly, the heat source comes from the thermal assisted magnetic head. FIG. 1a shows a perspective view of a conventional thermal assisted magnetic head 100. The thermal assisted magnetic head 100 includes a slider substrate 110 having an air bearing surface (ABS) (not shown, under) processed so as to provide an appropriate flying height and a laser diode module 130 mounted on the slider substrate 110. The slider substrate 110 includes a bottom surface 112 opposite the ABS, a trailing edge 113 where read and write elements 115 are embedded, and a leading edge (not shown, back) opposite the trailing edge 113. The laser diode module 130 is mounted on the position where the write elements are embedded via a bonding layer. The laser diode module 130 includes a laser diode 131 located near the write element and a mounting base 132 for supporting the laser diode 131. The mounting base 132 is bonded to the slider substrate 110 by using a solder layer, for example. The laser diode 131 emits a laser light to a portion of the magnetic recording medium, which reduces the medium's coercivity. After that, writing is performed by applying write magnetic field to the heated portion; therefore the writing operation is facilitated.

With this arrangement of the laser diode module 130, the laser diode module 130 is vertically mounted on the slider substrate 110, the laser light is emitted perpendicular to top and bottom surfaces of the laser diode 131. As shown, the laser lights with two directions includes a downward laser light 191 emitted from the top surface of the laser diode 131 to the write element (the direction facing to a rotating disk is so-called downward, herein), and an upward laser light 192 emitted from the bottom surface of the laser diode 131 (the direction against a rotating disk is so-called upward), so as to reach a photodiode 133 embedded in the mounting base 132 thereby detecting the laser light.

Figure 1B:
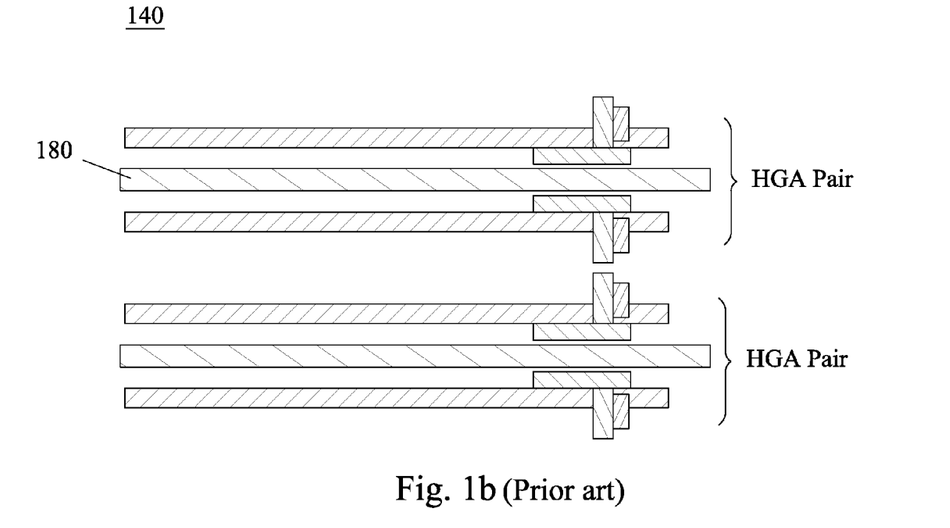
FIG. 1b is a partial side view of a head stack assembly with the thermal assisted magnetic heads.
Figure 1C:
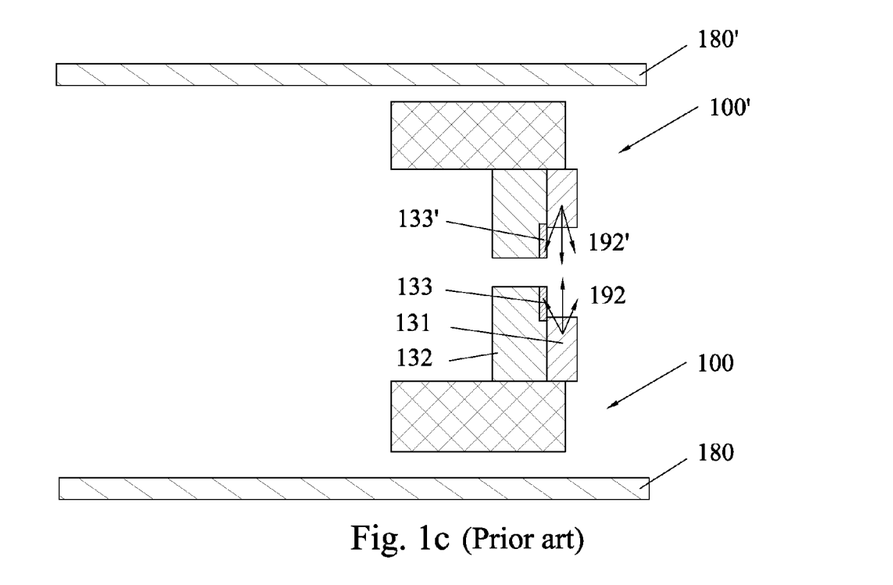
FIG. 1c is a partial view of the head stack assembly of FIG. 1b, which shows two adjacent thermal assisted magnetic head in adjacent HGA pair.

However, in the HSA level, the upward laser light 192 becomes an undesired light for adjacent laser diode which may affect the stability of the interfered laser diode. Many HGAs with a thermal assisted magnetic head are stacked in a HSA, every two thermal assisted magnetic heads and every two HGAs facing the same rotating disks are so-called a thermal assisted magnetic head pair, a HGA pair, here. FIG. 1b is a partial side view of a HSA 140 that shows two HGA pairs, FIG. 1c is a partial view of FIG. 1b, which shows light interference and coupling status. As shown, a first laser diode 131 of a first thermal assisted magnetic head 100 facing the first disk 180 emits a first upward laser light 192, and a second laser diode 131' of a second thermal assisted magnetic head 100' facing the second disk 180' in the adjacent HGA emits a second upward laser light 192'. Some of the first upward laser light 192 and the second upward laser light 192' are received and detected by their separated photodiodes 133, 133' respectively, and some of them are interfered and coupled each other, which may generate negative effect. For example, the first upward laser light 192 may be received and detected by the photodiode 133' of the second thermal assisted magnetic head 100', which causes the detection result of the photodiode 133' is incorrect, and in turns, the laser power of the second thermal assisted magnetic head 100' could not be controlled well, finally thermal stability of the second thermal assisted magnetic head 100' is reduced. And the thermal stability of the first thermal assisted magnetic head 100 is weakened vice versa.

Accordingly, it is desired to provide improved HSA with light shielding structure, and disk drive unit to overcome the above-mentioned drawbacks.

SUMMARY OF THE INVENTION

One aspect of the present invention is to provide a head stack assembly with a light shielding structure, to shield undesired laser light to interfere adjacent laser diode module of adjacent head gimbal assembly, thereby improving thermal stability of the thermal assisted magnetic head.

Another aspect of the present invention is to provide a disk drive unit including a head stack assembly with a light shielding structure, to shield undesired laser light to interfere adjacent laser diode module of adjacent head gimbal assembly, thereby improving thermal stability of the thermal assisted magnetic head.

To achieve above objectives, a head stack assembly of the present invention includes a mounting base, a plurality of drive arms connected with the mounting base, and multiple pairs of head gimbal assemblies connected with the drive arms. Each head gimbal assembly includes a thermal assisted magnetic head, the thermal assisted magnetic head has an air bearing surface, a bottom surface opposite to the air bearing surface, and a laser diode module mounted on the bottom surface and adapted to emit a downward laser light to a write element of the thermal assisted magnetic head and an upward laser light, wherein a light shielding structure is provided to prevent the upward laser light emitting to other laser diode modules to generate light coupling.

As a preferred embodiment, the light shielding structure is a tilting structure arranged for the laser diode module.

Preferably, the laser diode module includes a mounting substrate and a laser diode unit mounted on the mounting substrate.

More preferably, the laser diode unit and the mounting substrate have a back surface respectively, the laser diode unit and the mounting substrate are tilted toward a trailing edge of the thermal assisted magnetic head, with a tilt angle is formed between the back surfaces and a vertical line perpendicular to the bottom surface of the thermal assisted magnetic head.

Optionally, the tilt angle is in a range of 0.5° to 1.5°.

As another embodiment, the mounting substrate is mounted on the bottom surface of the thermal assisted magnetic head vertically, and the laser diode unit is mounted on the bottom surface of the thermal assisted magnetic head slantwise, with a tilt angle is formed between a top surface of the laser diode unit and the bottom surface of the thermal assisted magnetic head.

Preferably, a photodiode unit is embedded in the mounting substrate and connected with the laser diode unit to detect the upward laser light.

As another embodiment, the light shielding structure includes a plurality of shielding plate connected with the mounting base.

Preferably, two thermal assisted magnetic heads of each pair of the head gimbal assembly are faced to a same rotating disk, and the shielding plate is set between two adjacent thermal assisted magnetic heads in adjacent pair of the head gimbal assembly.

More preferably, the shielding plate is made of conductive and nontransparent material.

A disk drive unit of the present invention includes a head stack assembly having a mounting base, a plurality of drive arms connected with the mounting base, and multiple pairs of head gimbal assemblies connected with the drive arms. Each head gimbal assembly includes a thermal assisted magnetic head having an air bearing surface, a bottom surface opposite to the air bearing surface, and a laser diode module mounted on the bottom surface and adapted to emit a downward laser light to a write element of the thermal assisted magnetic head and an upward laser light, wherein a light shielding structure is provided to prevent the upward laser light emitting to other laser diode modules to generate laser light coupling.

In comparison with the prior art, as the present invention provides a light shielding structure to prevent the upward laser light emitting to other laser diode modules to generate light coupling, thus the upward laser light may not received by a photodiode of the adjacent laser diode module, and less light coupling is generated, therefore the detection result of the adjacent photodiode is accurate, and in turns, the laser power of the adjacent thermal assisted magnetic head is easy to control, finally thermal stability of the adjacent thermal assisted magnetic head is improved.

Other aspects, features, and advantages of this invention will become apparent from the following detailed description when taken in conjunction with the accompanying drawings, which are a part of this disclosure and which illustrate, by way of example, principles of this invention.

BRIEF DESCRIPTION OF THE DRAWINGS

The accompanying drawings facilitate an understanding of the various embodiments of this invention. In such drawings:

FIG. 3b is a simplified and partial side view of the head stack assembly shown in FIG. 3a;

DETAILED DESCRIPTION OF ILLUSTRATED EMBODIMENTS

Various preferred embodiments of the invention will now be described with reference to the figures, wherein like reference numerals designate similar parts throughout the various views. As indicated above, the invention is directed to a head stack assembly (HSA) with a light shielding structure, and a disk drive unit with the same, which can shield undesired laser light emitted by a laser diode module to prevent light coupling between adjacent laser diode modules, so as to improve thermal stability of the thermal assisted magnetic head.

Figure 2:
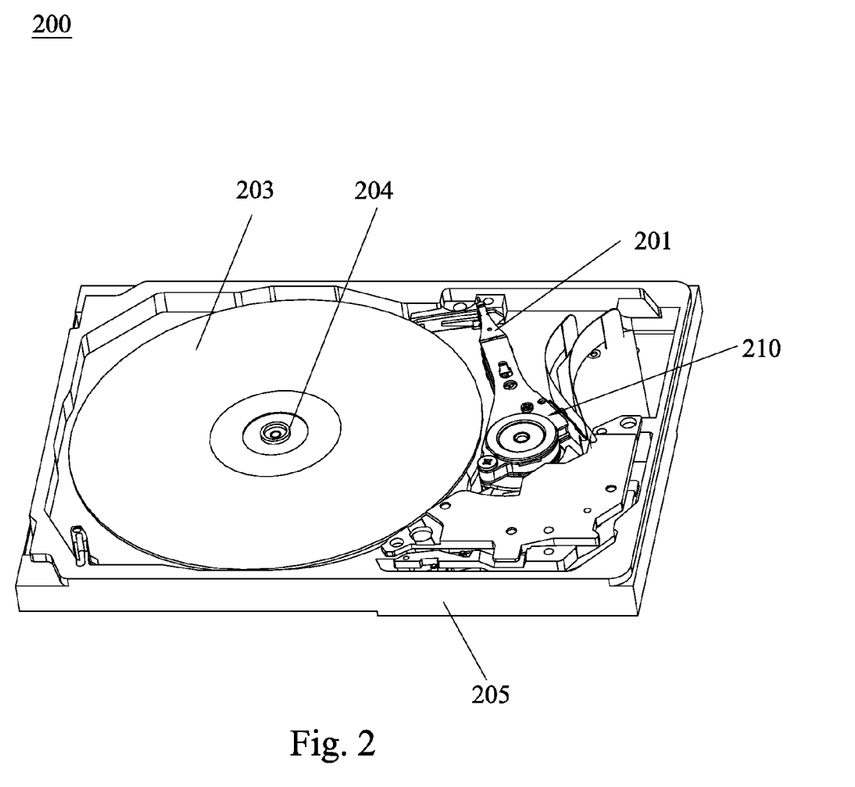
FIG. 2 is a perspective view of a disk drive unit according to one embodiment of the present invention.
Figure 3A:
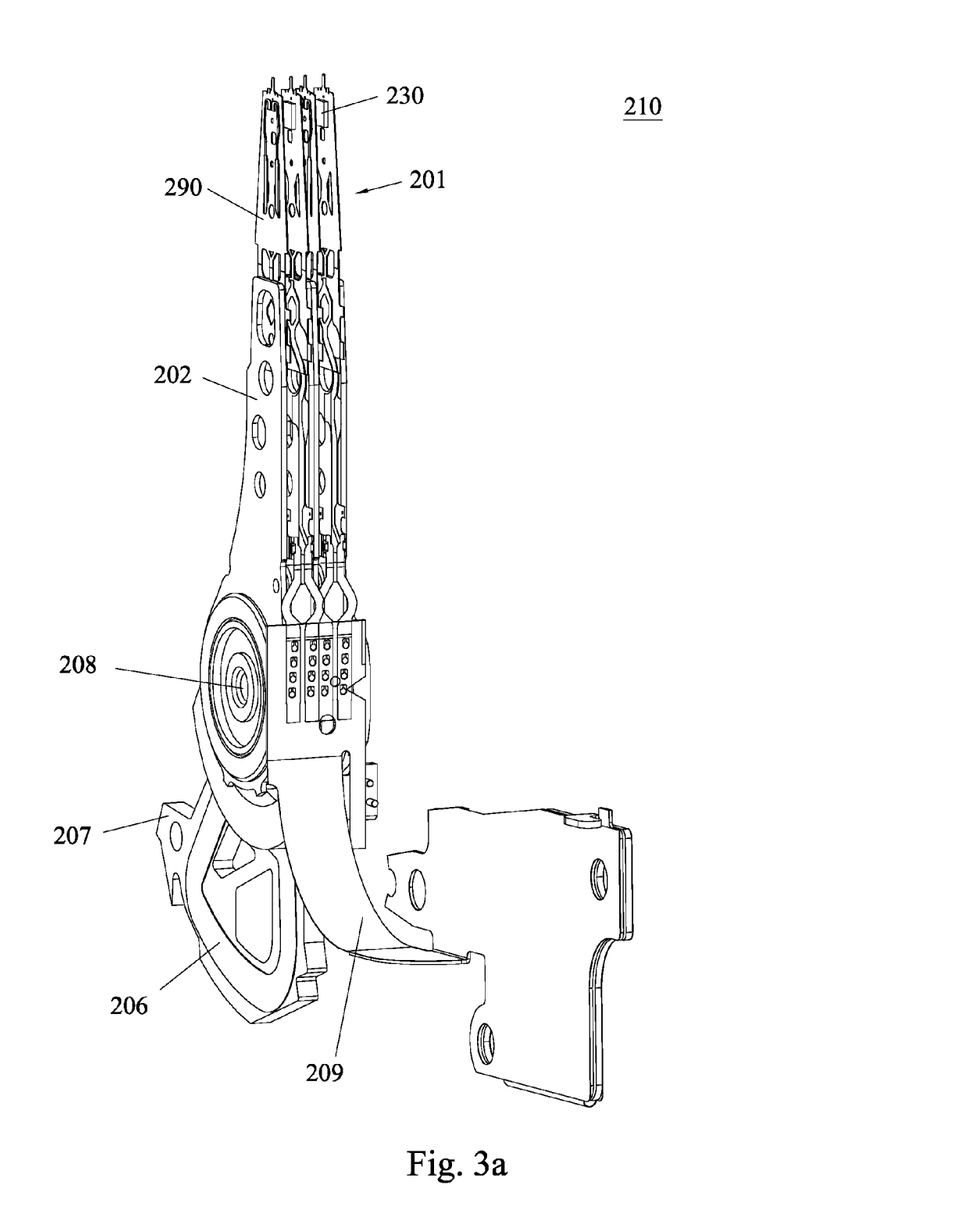
FIG. 3a is a perspective view of a head stack assembly with thermal assisted magnetic heads according to one embodiment of the present invention.
Figure 3B:
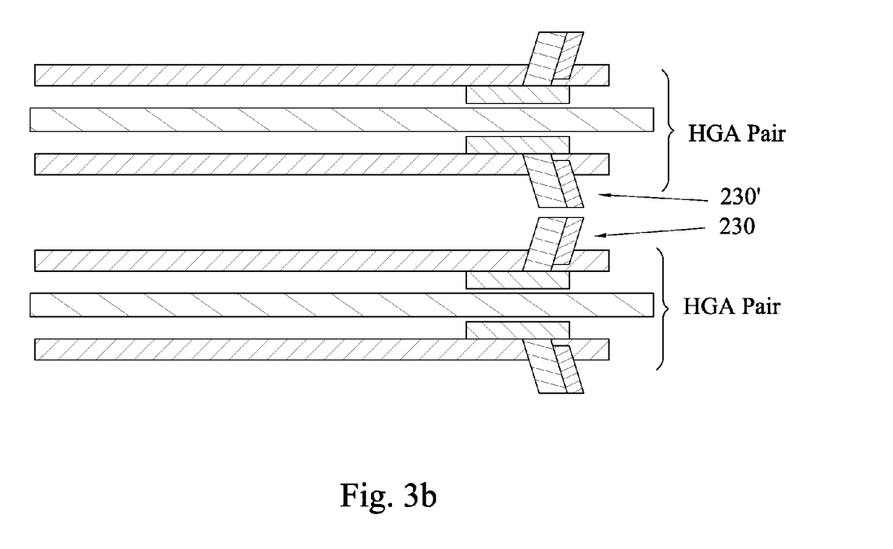

FIG. 2 is a perspective view of a disk drive unit according to one embodiment of the present invention. The disk drive unit 200 includes a HSA 210 with multiples HGAs 201, drive arms 202 stacked and by a bearing 208 connected to the HGAs 201, a series of rotatable disks 203, and a spindle motor 204 to spin the disks 203, all of which are mounted in a housing 205. As shown in FIG. 3, the HSA 210 includes a mounting base having a voice coil 206 and a fantail spacer 207 which are connected with the drive arms 202, and a FPC 209 is connected at the side. Each HGA 201 includes a suspension 290 and a thermally assisted magnetic head 230 carried on the suspension 290 for reading from and writing into the rotatable disks 203. The suspension 290 includes a load beam (not labeled), a base plate (not labeled), a hinge (not labeled) and a flexure (not labeled), all of which are assembled with each other. As the main structure of the HGA 201 is known to the persons skilled in the art, thus is omitted here. Specifically, the thermally assisted head 230 is carried on the flexure. As shown in FIG. 3b, the figure shows a simplified and partial side view of the HSA 210, and two HGA pairs and two disks are illustrated, for better illustration.

Figure 4:
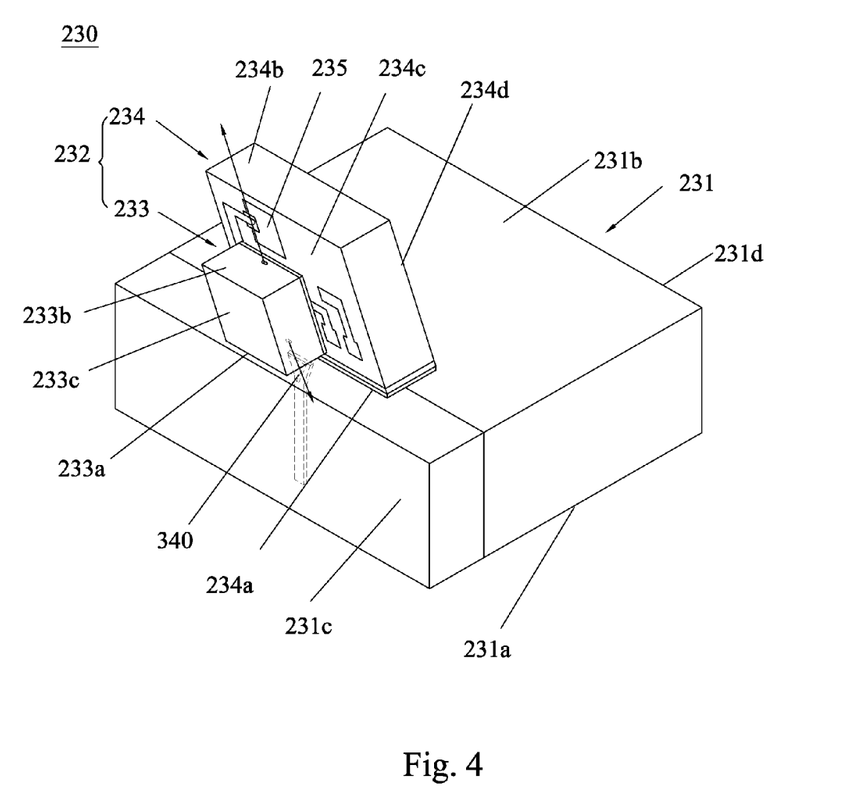
FIG. 4 is a perspective view of a thermal assisted magnetic head according to one embodiment of the present invention.

Referring to FIG. 4, the thermally assisted magnetic head 230 in the HSA 210 according to the present invention is illustrated. The thermally assisted magnetic head 230 includes a slider substrate 231 and a laser diode module 232 formed on the slider substrate 231 for thermally assisted magnetic recording. The laser diode module 232 includes a laser diode unit 233 and a mounting substrate 234 for supporting the laser diode unit 233. In the present embodiment, the slider substrate 231, the laser diode unit 233, and the mounting substrate 234 are generally rectangular shaped.

As shown, the slider substrate 231 has an ABS 231a, a bottom surface 231b opposite to the ABS 231a, a trailing edge 231c, a leading edge 231d opposite to the trailing edge 231c, and two side surfaces (not labeled). The ABS 231a facing to the disk is processed so as to provide an appropriate flying height, and a read/write element 340 is embedded in the trailing edge 231c. The trailing edge 231c has multiple bonding pads (not shown) to connect with a suspension 290 of the HGA 201. Specifically, the laser diode module 232 is mounted on the bottom surface 231b, for emitting laser light to facilitate writing.

Figure 5:
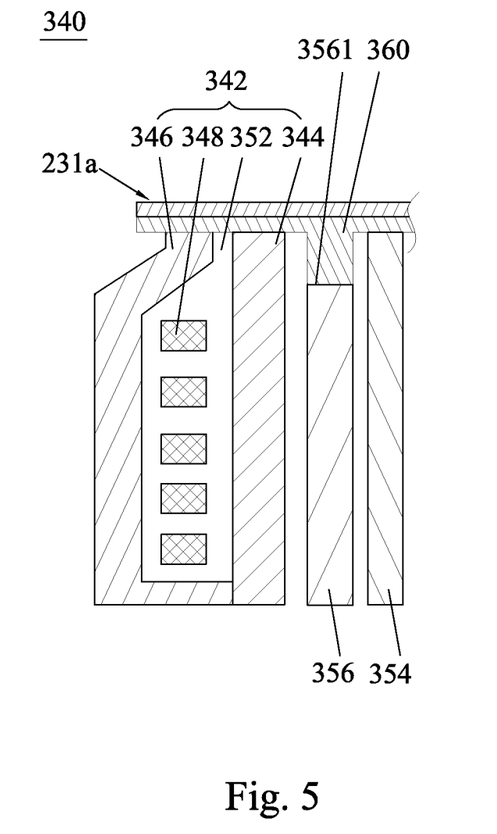
FIG. 5 is a cross-section view of a write element of the thermal assisted magnetic head shown in FIG. 4.

Concretely, as shown in FIG. 5, the write element 342 includes a first magnetic pole 344, a second magnetic pole 346, coils 348 and a first gap layer 352 sandwiched between the first and second magnetic poles 344, 346, a waveguide 354 formed adjacent to the first magnetic pole 344 for guiding light generated by the laser diode module 233, and a plasmon unit 356 sandwiched between the first magnetic pole 344 and the waveguide 354 for propagating near-field light to the ABS 231a. Commonly, the first magnetic pole 344 is a main pole, and the second magnetic pole 346 is a return pole. The plasmon unit 356 can be a plasmon generator or a plasmon antenna. Concretely, the plasmon unit 356 includes a near-field light generating surface 3561 facing to the ABS 231a. The plasmon unit 356 is made of nonmagnetic materials.

During writing operations, the thermally assisted magnetic head 230 aerodynamically flies above the surface of the rotating disks 203 with a predetermined flying height. When writing data, signal current is conducted through the coils 348 and flux is induced into the first and second magnetic poles 344, 346, which causes flux to fringe across the pole tips at the ABS 231a. This flux magnetizes circular tracks on the rotating disk 203 during a write operation. Meanwhile, laser light is generated from the laser diode unit 233, and propagated through the waveguide 354 and guided to the plasmon unit 356. Then, the near-field generating surface 3561 of the plasmon unit 356 will generate near-field light which may be propagated to the ABS 231a. The generated near-field light reaches the surface of the magnetic disk 203, and heats a portion of the magnetic recording layer of the magnetic disk 203. As a result, the coercive force of the portion is decreased to a value that facilitates writing; thus the thermally assisted magnetic recording can be accomplished successfully.

Detailed description of the laser diode module 232 follows now.

Referring to FIG. 4, the laser diode unit 233 has a top surface 233a, a bottom surface 233b opposite to the top surface 233a, a front surface 233c and a back surface (not labeled) opposite to the front surface 233c. Accordingly, the mounting substrate 234 includes a top surface 234a, a bottom surface 234b opposite to the top surface 234a, a front surface 234c and a back surface 234d opposite to the front surface 234c. The back surface of the laser diode unit 233 is bonded to the front surface 234c of the mounting substrate 234 with its bottom surface 233b parallel to the bottom surface 234b of the mounting substrate 234. And the top surface 234a of the mounting substrate 234 is bonded to the bottom surface 231b of the slider substrate 231, via a metal layer and a solder layer (not shown). A photodiode 235 is embedded in the mounting substrate 234 for detecting the laser light emitted by the laser diode unit 233.

Within the contemplation of the present invention, a light shielding structure is provided to prevent the undesired laser light interference to the adjacent thermal assisted magnetic head in the adjacent HGA pair. In this embodiment, the light shielding structure is a tilting structure arranged for the laser diode module 232.

Figure 6:
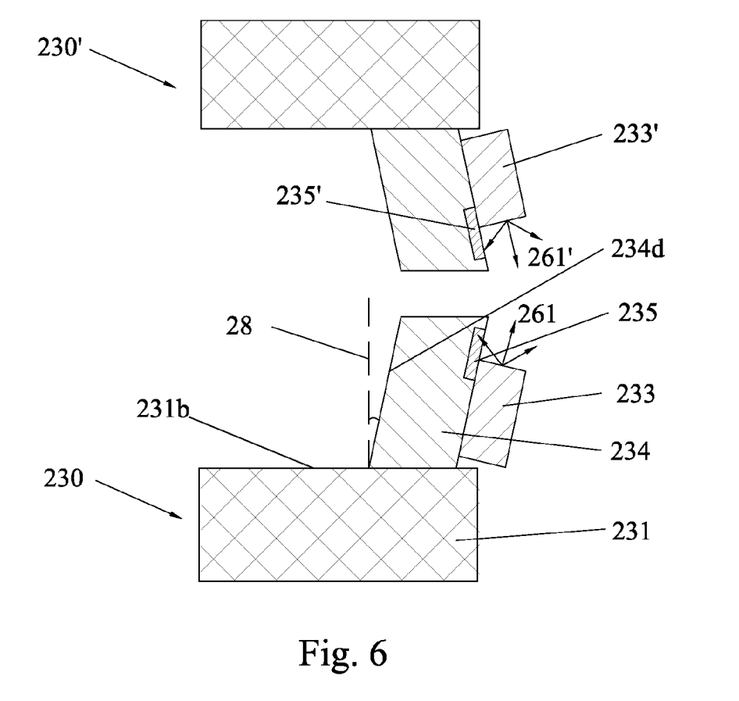
FIG. 6 is a partial view of the head stack assembly of FIG. 3b, which shows two adjacent thermal assisted magnetic head in adjacent HGA pair.

As shown in FIGS. 4 and 6, the laser diode unit 233 and the mounting substrate 234 are tilted toward the trailing edge 231c of the slider substrate 231, with a tilt angle is formed between the back surface 234d of the mounting substrate 234 and a vertical line 28 perpendicular to the bottom surface 231b of the slider substrate 231. Specifically, as mentioned above, the back surface of the laser diode unit 233 is bonded to the front surface 234c of the mounting substrate 234 with its bottom surface 233b parallel to the bottom surface 234b of the mounting substrate 234, thus, the laser diode unit 233 is tilted accordingly as the mounting substrate 234 is titled with the tilt angle. Preferably, the tilt angle is in a range of 0.5° to 1.5°.

With this configuration of the tilting laser diode modules 232, the direction of the upward laser light 261 emitted from the laser diode 233 is changed with a minor inclining, thus the upward laser light 261 may not received by the photodiode 235' of the adjacent laser diode unit 233', and less light coupling is generated, therefore the detection result of the adjacent photodiode 235' is accurate, and in turns, the laser power of the adjacent thermal assisted magnetic head 230' is easy to control, finally thermal stability of the adjacent thermal assisted magnetic head is improved.

Figure 7:
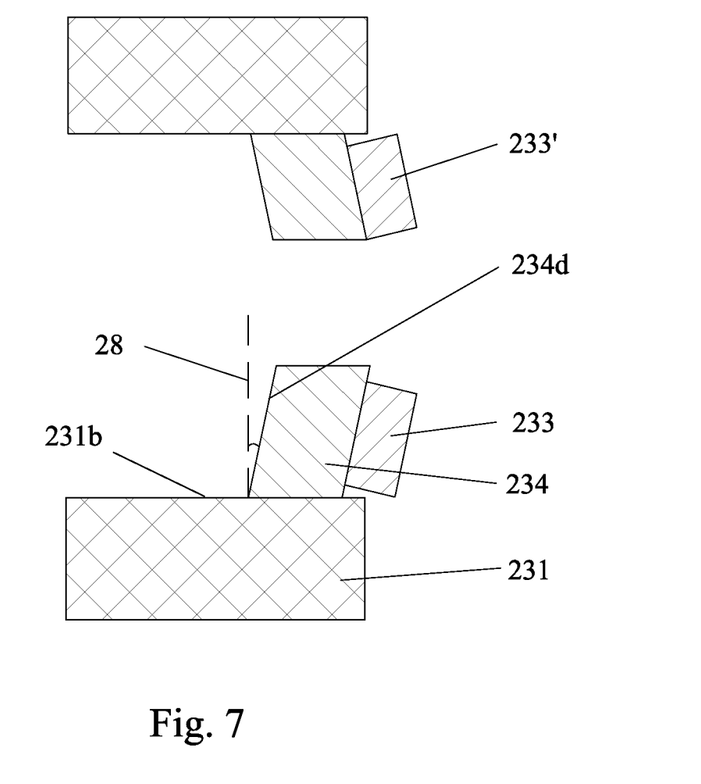
FIG. 7 is a partial view of the head stack assembly according to a second embodiment of the present invention.

As an optional embodiment, as shown in FIG. 7, the photodiode could be omitted from the mounting substrate 234 and connected to another position of the thermal assisted magnetic head to detect the laser light emitted from the laser diode module 232, by which the height of the mounting substrate 234 is reduced, thereby satisfying the demand of a compact and small magnetic head nowadays. Similar to the first embodiment, the tilting laser diode module 232 is presented in the embodiment as well. Less light coupling is generated between two adjacent laser diode units, thus thermal stability of the adjacent thermal assisted magnetic heads is maintained. Similar descriptions of the similar components are omitted here.

Figure 8:
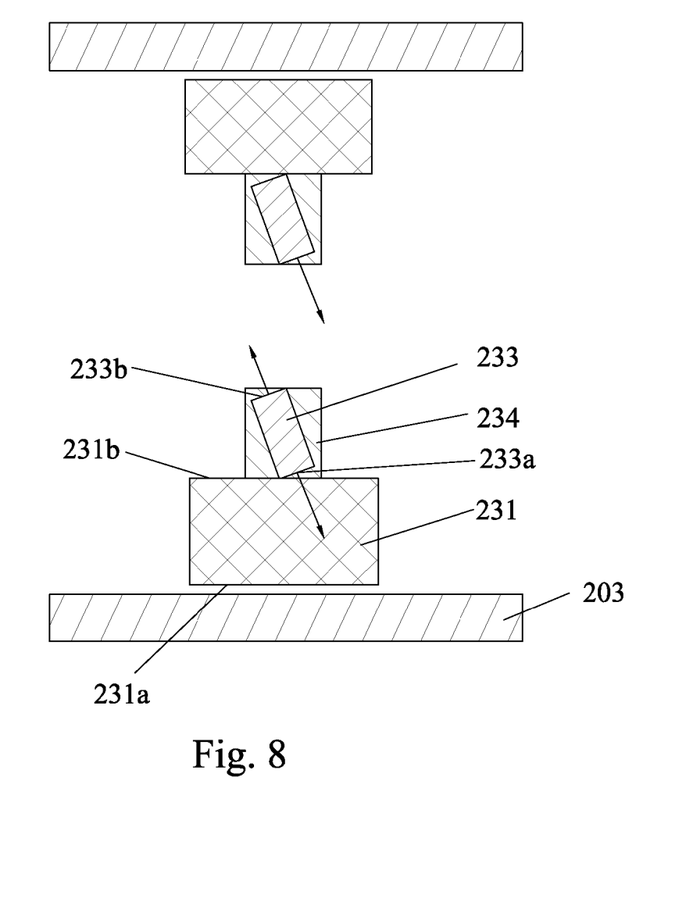
FIG. 8 is a partial view of the head stack assembly according to a third embodiment of the present invention.

FIG. 8 shows a partial view of the HSA according to a third embodiment of the present invention. Different from the first embodiment, the mounting substrate 234 in this embodiment is mounted on the bottom surface 231b of the slider substrate 231 vertically, without tilting, and the laser diode unit 233 is mounted on the bottom surface 231b of the slider substrate 231 slantwise, with a tilt angle is formed between the top surface 233a of the laser diode unit 233 and the bottom surface 231b of the slider substrate 231. In this embodiment, the bottom surface 233b of the laser diode unit 233 is tilted which may reduce the light interference and light coupling between two adjacent laser diode units, thus thermal stability of the adjacent thermal assisted magnetic heads is maintained.

Figure 9:
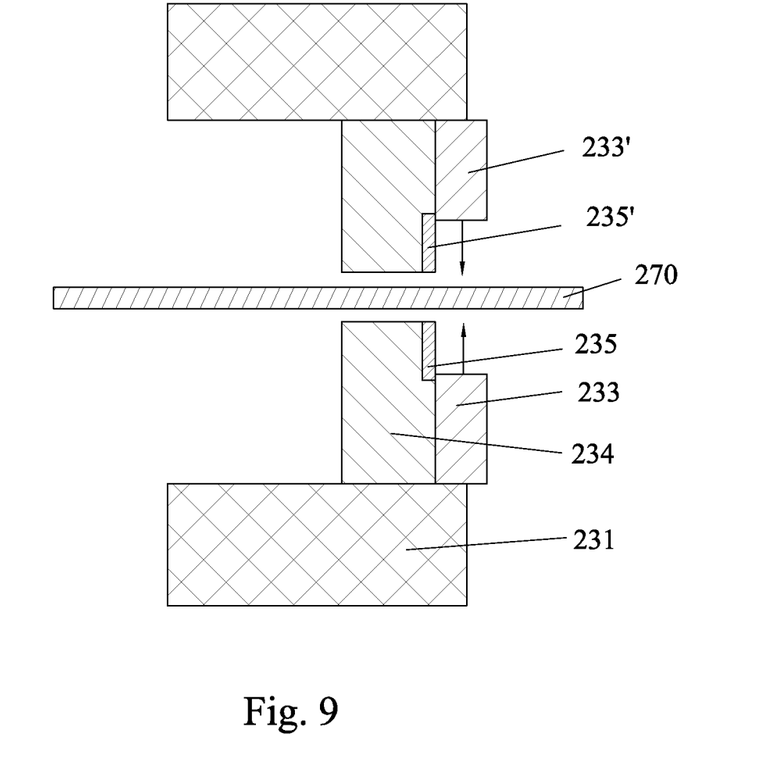
FIG. 9 is a partial view of the head stack assembly according to a fourth embodiment of the present invention.

FIG. 9 is a partial view of the HSA according to a fourth embodiment of the present invention. In this embodiment, the light shielding structure is a shielding plate 270. Specifically, a plurality of shielding plates 270 are connected with the mounting base of the HSA, each of them is set between two adjacent slider substrates 231 in the adjacent HGA pairs. In this situation, the laser diode module 232 is mounted on the slider substrate 231 vertically, without tilting. Preferably, the shielding plate 270 is made of conductive and nontransparent material, by which the upward laser light of the adjacent laser diode unit 232 are shielded and the heat is absorbed. Thus undesired upward laser light may not received by the photodiode 235' of the adjacent laser diode unit 233', therefore the detection result of the adjacent photodiode is accurate, and in turns, the laser power of the adjacent thermal assisted magnetic head is easy to control, finally thermal stability of the adjacent thermal assisted magnetic head is improved.

While the invention has been described in connection with what are presently considered to be the most practical and preferred embodiments, it is to be understood that the invention is not to be limited to the disclosed embodiments, but on the contrary, is intended to cover various modifications and equivalent arrangements included within the spirit and scope of the invention.

What is claimed is:

1. A head stack assembly, comprising a mounting base, a plurality of drive arms connected with the mounting base, and multiple pairs of head gimbal assemblies connected with the drive arms, each head gimbal assembly comprising a thermal assisted magnetic head, the thermal assisted magnetic head comprising an air bearing surface, a bottom surface opposite to the air bearing surface, and a laser diode module mounted on the bottom surface and adapted to emit a downward laser light to a write element of the thermal assisted magnetic head and an upward laser light, wherein a light shielding structure is provided to prevent the upward laser light emitting to other laser diode modules to generate light coupling, and the light shielding structure is a tilting structure arranged for the laser diode module.

2. The head stack assembly according to claim 1, wherein the laser diode module comprises a mounting substrate and a laser diode unit mounted on the mounting substrate.

3. The head stack assembly according to claim 2, wherein the laser diode unit and the mounting substrate have a back surface respectively, the laser diode unit and the mounting substrate are tilted toward a trailing edge of the thermal assisted magnetic head, with a tilt angle is formed between the back surfaces and a vertical line perpendicular to the bottom surface of the thermal assisted magnetic head.

4. The head stack assembly according to claim 3, wherein the tilt angle is in a range of 0.5° to 1.5°.

5. The head stack assembly according to claim 2, wherein the mounting substrate is mounted on the bottom surface of the thermal assisted magnetic head vertically, and the laser diode unit is mounted on the bottom surface of the thermal assisted magnetic head slantwise, with a tilt angle is formed between a top surface of the laser diode unit and the bottom surface of the thermal assisted magnetic head.

6. The head stack assembly according to claim 2, wherein a photodiode unit is embedded in the mounting substrate and connected with the laser diode unit to detect the upward laser light.

7. A head stack assembly, comprising a mounting base, a plurality of drive arms connected with the mounting base, and multiple pairs of head gimbal assemblies connected with the drive arms, each head gimbal assembly comprising a thermal assisted magnetic head, the thermal assisted magnetic head comprising an air bearing surface, a bottom surface opposite to the air bearing surface, and a laser diode module mounted on the bottom surface and adapted to emit a downward laser light to a write element of the thermal assisted magnetic head and an upward laser light wherein a light structure is provided to prevent the upward laser light emitting to other laser diode modules to generate light coupling, and the light shielding structure comprises a plurality of shielding plate connected with the mounting base.

8. The head stack assembly according to claim 7, wherein two thermal assisted magnetic heads of each pair of the head gimbal assembly are faced to a same rotating disk, and the shielding plate is set between two adjacent thermal assisted magnetic heads in adjacent pair of the head gimbal assembly.

9. The head stack assembly according to claim 7, wherein the shielding plate is made of conductive and nontransparent material.

10. A disk drive unit, comprising a head stack assembly comprising a mounting base, a plurality of drive arms connected with the mounting base, and multiple pairs of head gimbal assemblies connected with the drive arms, each head gimbal assembly comprising a thermal assisted magnetic head having an air bearing surface, a bottom surface opposite to the air bearing surface, and a laser diode module mounted on the bottom surface and adapted to emit a downward laser light to a write element of the thermal assisted magnetic head and an upward laser light, wherein a light shielding structure is provided to prevent the upward laser light emitting to other laser diode modules to generate laser light coupling, and the light shielding structure is a tilting structure arranged for the laser diode module.

11. The disk drive unit according to claim 10, wherein the laser diode module comprises a mounting substrate and a laser diode unit mounted on the mounting substrate.

12. The disk drive unit according to claim 11, wherein the laser diode unit and the mounting substrate have a back surface respectively, the laser diode unit and the mounting substrate are tilted toward a trailing edge of the thermal assisted magnetic head, with a tilt angle is formed between the back surfaces and a vertical line perpendicular to the bottom surface of the thermal assisted magnetic head.

13. The disk drive unit according to claim 12, wherein the tilt angle is in a range of 0.5° to 1.5°.

14. The disk drive unit according to claim 11, wherein the mounting substrate is mounted on the bottom surface of the thermal assisted magnetic head vertically, and the laser diode unit is mounted on the bottom surface of the thermal assisted magnetic head slantwise, with a tilt angle is formed between a top surface of the laser diode unit and the bottom surface of the thermal assisted magnetic head.

15. The disk drive unit according to claim 11, wherein a photodiode unit is embedded in the mounting substrate and connected with the laser diode unit to detect the upward laser light.

16. A disk drive unit, comprising a head stack assembly comprising a mounting base, a plurality of drive arms connected with the mounting base, and multiple pairs of head gimbal assemblies connected with the drive arms, each head gimbal assembly comprising a thermal assisted magnetic head having an air bearing surface, a bottom surface opposite to the air bearing surface, and a laser diode module mounted on the bottom surface and adapted to emit a downward laser light to a write element of the thermal assisted magnetic head and an upward laser light, wherein a light shielding structure is provided to prevent the upward laser light emitting to other laser diode modules to generate laser light coupling, and the light shielding structure comprises a plurality of shielding plate connected with the mounting base.

17. The disk drive unit according to claim 16, wherein two thermal assisted magnetic heads of each pair of the head gimbal assembly are faced to a same rotating disk, and the shielding plate is set between two adjacent thermal assisted magnetic heads in adjacent pair of the head gimbal assembly.

18. The disk drive unit according to claim 16, wherein the shielding plate is made of conductive and nontransparent material.

* * * * *